United States Patent [19]

Nakanishi

[11] Patent Number: 5,405,097
[45] Date of Patent: Apr. 11, 1995

[54] LOADING MECHANISM OF CASSETTE TAPE RECORDER

[75] Inventor: Yasuyuki Nakanishi, Sanda, Japan

[73] Assignee: Mitsubishi Denki Kabushiki Kaisha, Tokyo, Japan

[21] Appl. No.: 826,673

[22] Filed: Jan. 23, 1992

Related U.S. Application Data

[63] Continuation of Ser. No. 507,131, Apr. 10, 1990, abandoned.

[30] Foreign Application Priority Data

Apr. 11, 1989 [JP] Japan .................................. 1-89753

[51] Int. Cl.6 .............................................. G11B 15/60
[52] U.S. Cl. .................................................. 242/338.4
[58] Field of Search ................ 242/197, 198, 199, 200, 242/338.4; 360/96.1, 96.5, 96.6

[56] References Cited

U.S. PATENT DOCUMENTS

| | | | |
|---|---|---|---|
| 4,337,490 | 7/1982 | Kamimura et al. | 360/96.6 |
| 4,467,378 | 8/1984 | Schatteman | 242/198 X |
| 4,628,383 | 9/1986 | Miyamoto | 360/96.5 |
| 4,639,801 | 1/1987 | Hoppmann et al. | 360/96.1 X |
| 4,680,654 | 7/1987 | Shibuya | 360/96.1 X |

FOREIGN PATENT DOCUMENTS

| | | |
|---|---|---|
| 0388624 | 9/1990 | European Pat. Off. . |
| 1552949 | 1/1969 | France . |
| 2540274 | 8/1984 | France . |
| 63-62948 | 4/1988 | Japan . |

OTHER PUBLICATIONS

*Patent Abstracts of Japan*, vol. 7, No. 101, (Apr. 28, 1983) & JP-A-58 23345 (Feb. 12, 1983).
*Patent Abstracts of Japan*, vol. 8, No. 171, (Aug. 08, 1984) & JP-A-59 65966 (Apr. 14, 1984).
*Patent Abstracts of Japan*, vol. 4, No. 156, (Oct. 31, 1980) & JP-A-55 105849 (Aug. 13, 1980).

*Primary Examiner*—Daniel P. Stodola
*Assistant Examiner*—John P. Darling
*Attorney, Agent, or Firm*—Burns, Doane, Swecker & Mathis

[57] ABSTRACT

In a loading mechanism of a digital audio tape recorder (DAT), a cassette holder (2) moves contacting with couplers (24) of reel winders (20) against pressure due to elastic forces of springs (23) in a movement from an insert position to a medium position where whole of the cassette (1) is entered in the housing, and thereby a deck (8) is positioned higher from bottom face (6a) of the housing (6) to make a space for mounting a printed circuit substrate having electric parts of driving circuit of the DAT and radio circuit on both faces thereof.

8 Claims, 10 Drawing Sheets

LOADING MECHANISM OF CASSETTE TAPE RECORDER

This application is a continuation of application Ser. No. 07/507,131, filed Apr. 10, 1990, now abandoned.

BACKGROUND OF THE INVENTION

1. Field of the Invention

The present invention relates to a loading mechanism of cassette tape recorder, and especially relates to loading mechanism of a cassette tape recorder such as digital audio tape recorder having a cassette holder for carrying the cassette between an insert position and a setting position.

2. Description of the Prior Art

A conventional loading mechanism of cassette tape recorder of, for example, a digital audio tape recorder (hereinafter abbreviated as DAT) is described referring to FIGS. 6, 7, 8 and 9.

FIG. 6 is a perspective view showing a part of the loading mechanism for holding and carrying a cassette. In FIG. 6, a cassette holder 2 holds and carries a cassette 1 which contains a magnetic tape wound between an insert position where the cassette 1 is inserted and a setting position where the magnetic tape is scanned by head. The cassette holder 2 has springs 3, 3 fixed thereon for pressing the cassette 1 and guide pins 5, 5 provided on both outside wails for guiding the motion of the cassette. A frame 4 has L-letter shaped guide grooves 4a, 4a provided on both vertical walls 4b, 4b for guiding the movement of the guide pins 5.

FIG. 7 is a perspective view showing an appearance of the DAT wherein the frame 4 is contained in a box-shaped housing 6. A front vessel 7 is provided in front of the housing 6 and has an offset apart 7a and recesses 7b, wherefrom, for example, a screw driver is to be inserted for driving screws for fixing or removing the DAT on or from a console box of an automobile. The recesses 7b are covered behind a cover panel 30.

FIG. 8 is a partially cross-sectional side view showing the conventional loading mechanism of the DAT and FIG. 9 is a perspective view showing a typical tape driving mechanism of tile DAT.

In FIG. 9, the loading mechanism comprises a deck 8 to be mounted in the housing 6, a pair of reel winders 9 provided on the deck 8 to be coupled with reels of the cassette 1 (not shown in tile figure), a capstan motor 31, a rotary drum 32, a tape driving motor 33 and a printed circuit board 10 disposed below the deck 8 and electric parts 11 fixed thereon (shown in FIG. 8). As shown in FIG. 8, a clearance having a measurement $H_1$ is kept between tile bottom face 2a of the cassette holder 2 and the top 9a of the reel winders 9 so as not to collide the cassette 1 with the reel winders 9 during in horizontal movement of the cassette holder 2.

Operation of the conventional loading mechanism of the DAT is described.

When the cassette 1 is inserted into the cassette holder 2, the cassette 1 is held in the cassette holder 2 by pressure of the springs 3. After that, the cassette holder 2 is moved from the insert position to the setting position by a driving source (not shown in the figures), in a manner that tile guide pins 5 on the cassette holder 2 makes a L-letter shaped trail by being guided by the guide grooves 4a. On the,setting position, the cassette 1 is set on a predetermined setting position by coupling of positioning holes on the cassette 1 with positioning pins on the deck 8 and holes of the reels in the cassette 1 are also coupled with the reel winders 9 (these are not shown in the figures because of obviousness).

Generally, the sizes of the housing 6 are standardized to be mounted on the console box of the automobile. The above-mentioned conventional loading mechanism of the DAT has a problem that the standardized housing 6 has no room between the deck 8 and bottom wall of the housing 6 for integrating a radio circuit on the printed circuit substrate 10.

SUMMARY OF THE INVENTION

Purpose of the present invention is to provide an improved loading mechanism of cassette tape recorder, for making a tape recorder such as DAT of multifunction or of small size.

A loading mechanism of cassette tape recorder in accordance with the present invention comprises:
  a deck;
  reel winding means rotatably mounted on the deck and having at least one set of a coupler slidably mounted on a base member for transmitting driving force to a reel in a cassette and a spring for pressing the coupler in a direction to part from the deck;
  a cassette holder having on outside walls thereof a pair of guide pins which are parallel to the deck for holding and carrying the cassette from an insert position to a setting position on the deck; and
  a frame having a pair of guide grooves on side walls which are vertical to the deck for guiding the movement of the cassette holder by sliding of the guide pins along in the guide grooves in a manner that the cassette holder contacts and presses down the coupler pressing of the spring during the movement of the holder from the insert position to a medium position and that the cassette holder is apart from the coupler during the movement from the medium position to the setting position.

Generally, the sizes of a housing containing the loading mechanism of the cassette tape recorder are standardized and the insert position provided on, for example, a front vessel is also standardized and not changeable.

In the present invention, the cassette holder for carrying the cassette is moved in a manner to press down the coupler from the insert position to the medium position where whole of the cassette is entered in the housing. Therefore, the deck is positioned relatively higher from the bottom of the housing than that of the conventional one. As a result, a space between the deck and the bottom of the housing is enlarged and can contain more electronics components than the conventional ones.

DESCRIPTION OF THE PREFERRED EMBODIMENTS

A preferred embodiment of a loading mechanism of cassette tape recorder in accordance with the present invention is described referring to FIG. 1, FIG. 2, FIG. 3A and 3B, FIGS. 4A, 4B, 4C, 4D, 4E and 4F and FIG. 5, 5A and 5B.

Figure 1:
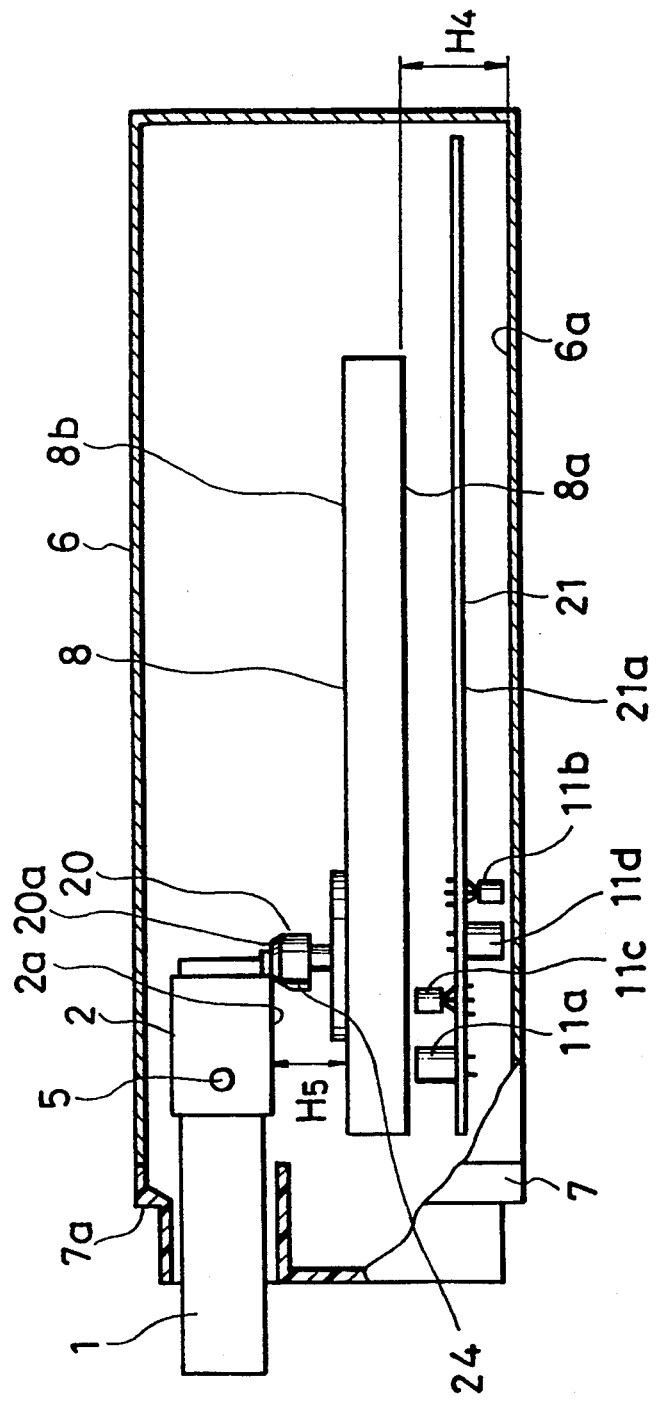
FIG. 1 is a partially cross-sectional side view showing a preferred embodiment of a loading mechanism of cassette recorder such as DAT in accordance with the present invention.
Figure 7:
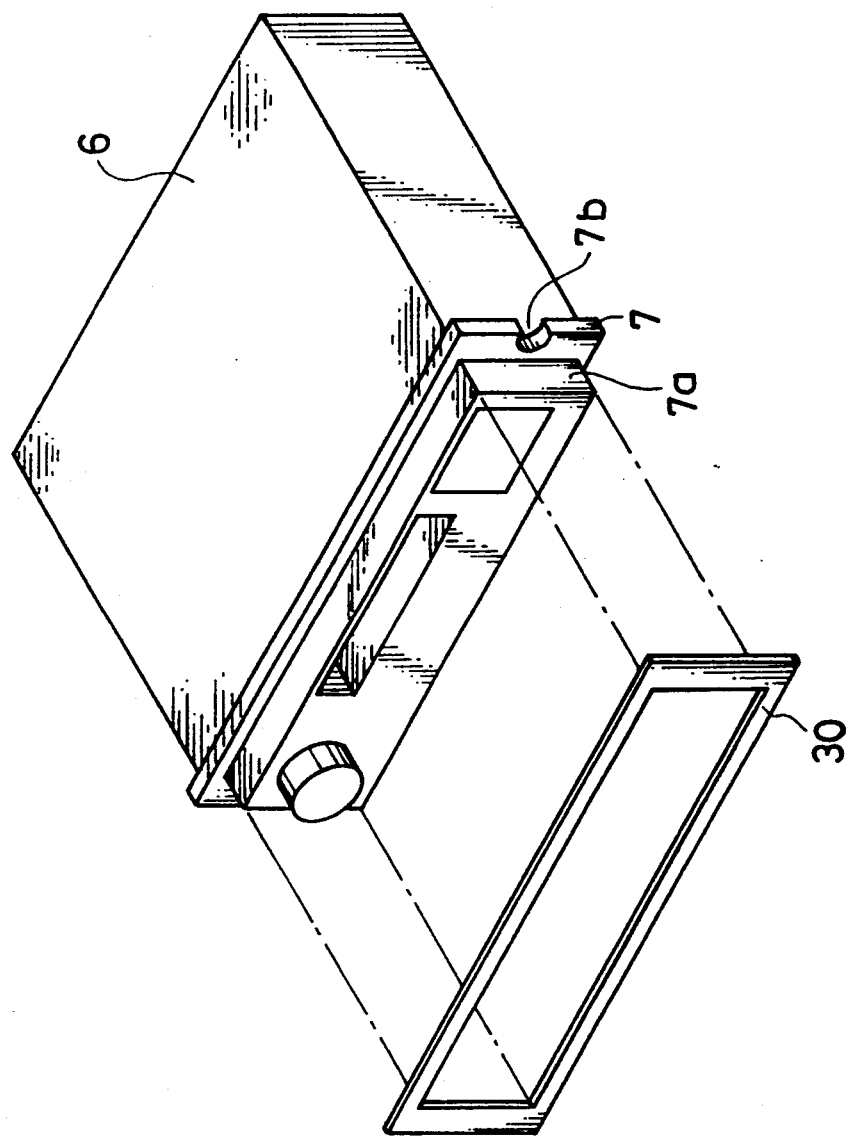
FIG. 7 is the perspective view showing the appearance of the conventional DAT.

FIG. 1 is a partially cross-sectional side view showing the loading mechanism of cassette tape recorder in accordance with the present invention. In FIG. 1, a front vessel 7 made of, for example, resin molding is provided in front of a box-shaped housing 6. The front vessel 7 has an offset part 7a and recesses (not shown in the figure) to be fixed on a console box of an automobile. Namely, the essential sizes of the front vessel 7 and the box-shaped housing 6 are standardized similarly to the conventional ones shown in FIG. 7.

Figure 8:
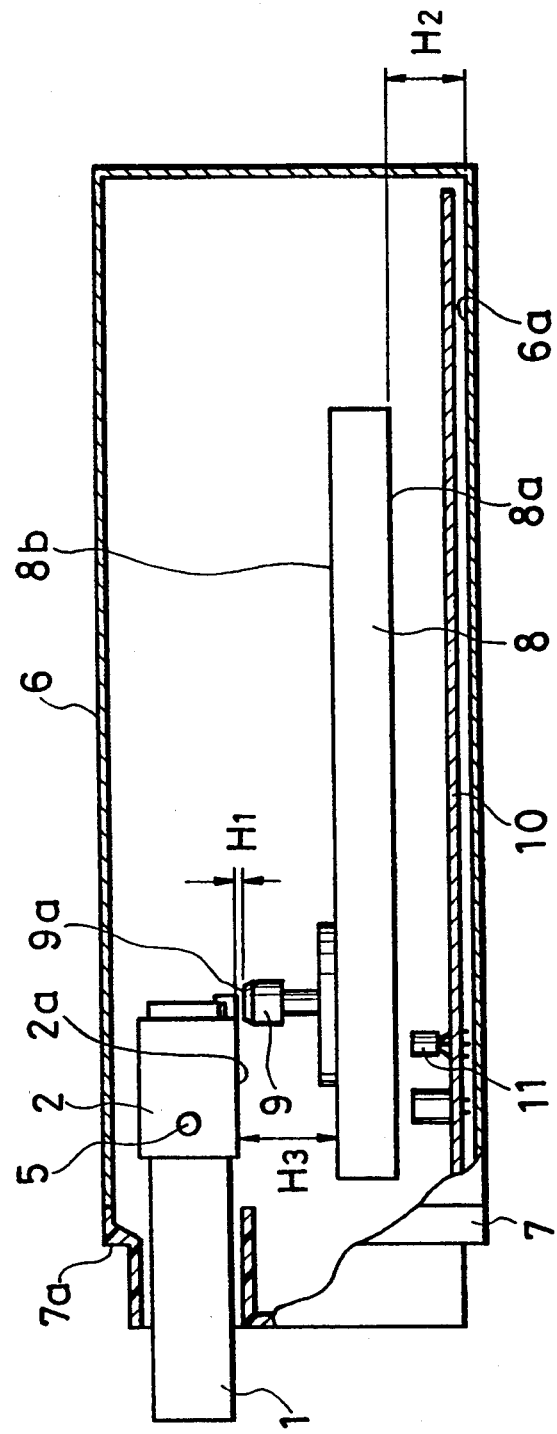
FIG. 8 is the partially cross-sectional side view showing the conventional loading mechanism of the DAT.
Figure 9:
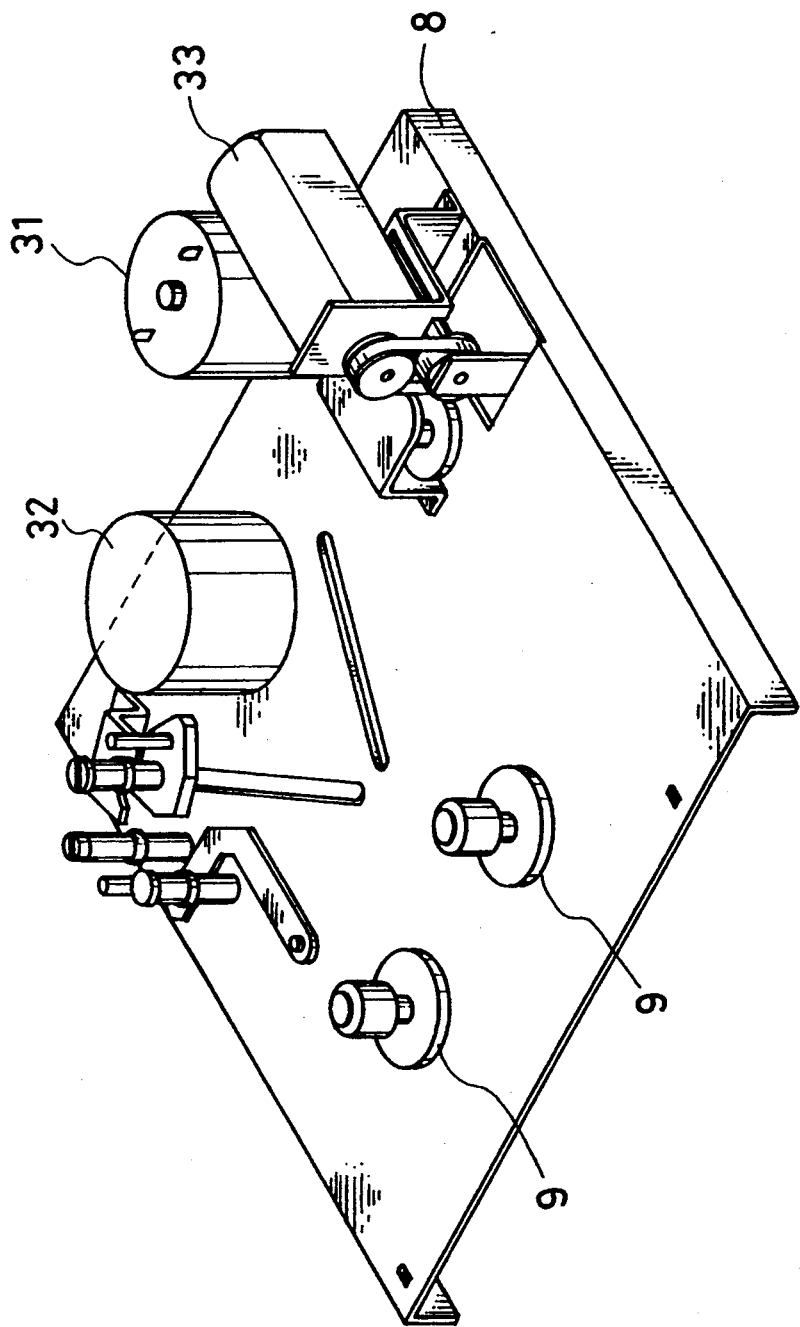
FIG. 9 is the perspective view showing the conventional and typical tape driving mechanism of the DAT.

A deck 8 has a pair of reel winders 20 which are disposed vertical to the deck 8. A capstan motor, a rotary drum, a tape driving motor are provided on the deck 8 but not shown in the figure because of well known and similar to that of FIG. 9. In comparison with FIGS. 1 and 8, the deck 8 in accordance with the present invention shown in FIG. 1 is fixed at a higher position in the housing 6 than that of the conventional one shown in FIG. 8. Namely, a distance $H_4$ between the rear face 8a of the deck 8 and the bottom face 6a of the housing 6 in FIG. 1 is larger than that of $H_2$ in FIG. 8. And as a result the distance $H_5$ between the bottom face 2a of a cassette holder 2 and the front face 8b of the deck 8 in FIG. 1 is smaller than that of $H_3$ in FIG. 8. At an insert position of the cassette 1 shown in FIG. 1, the bottom face 2a of the cassette holder 2 contacts the top 20a of the reel winder 20.

In a space between the bottom face 8a of the deck 8 and the bottom face 6a of the housing 6, a printed circuit substrate 21 is disposed. Electric parts 11a, 11b, 11c, 11d . . . are mounted on both faces of the circuit substrate 21.

Figure 2:
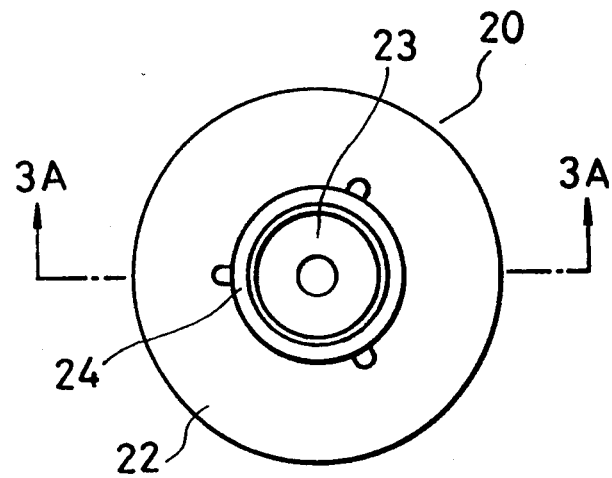
FIG. 2 is a plan view showing a reel winder of the loading mechanism of cassette tape recorder in accordance with the present invention.
Figure 3A:
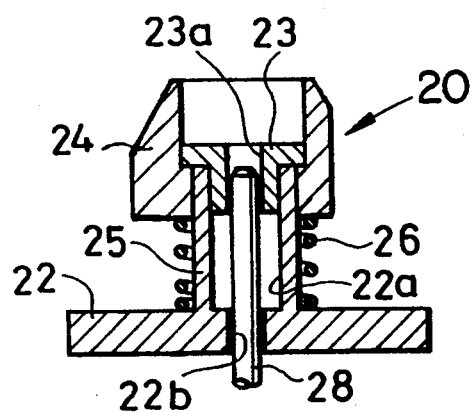
FIG. 3A is a cross-sectional side view of the reel winder shown in FIG. 2 wherein a coil spring 26 expands.
Figure 3B:
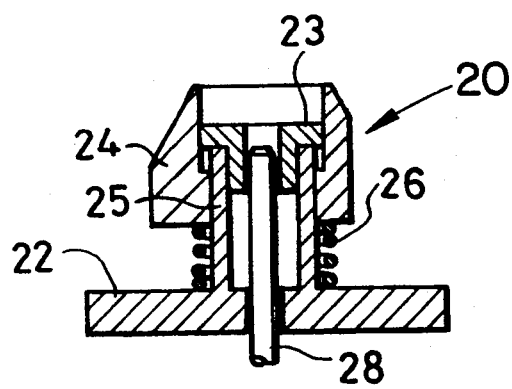
FIG. 3B is a cross-sectional side view of the reel winder shown in FIG. 2 wherein the coil spring 26 is contracted.
Figure 4A:
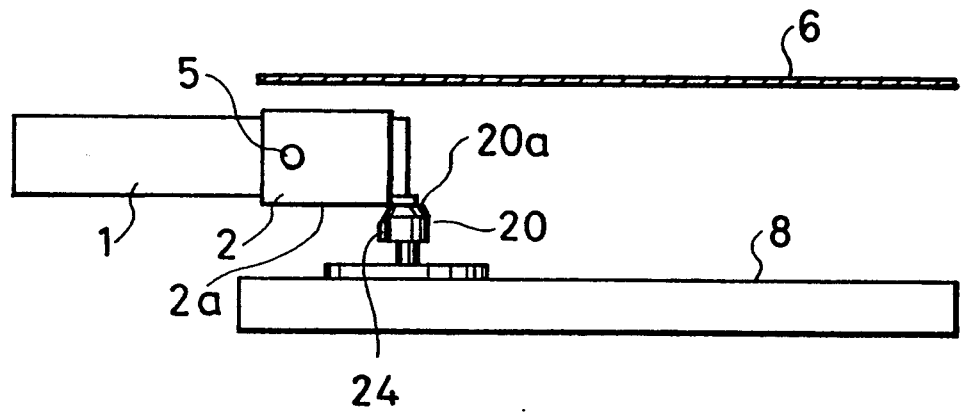
FIGS. 4A, 4B, 4C, 4D, 4E and 4F are cross-sectional side views showing a serial movements of a cassette holder 2 and the reel winder 20 of the loading mechanism of cassette tape recorder in accordance with the present invention.
Figure 4B:
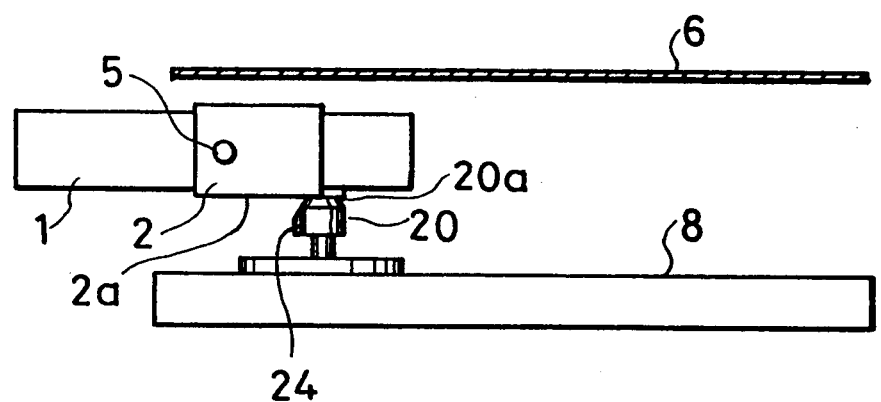
Figure 4C:
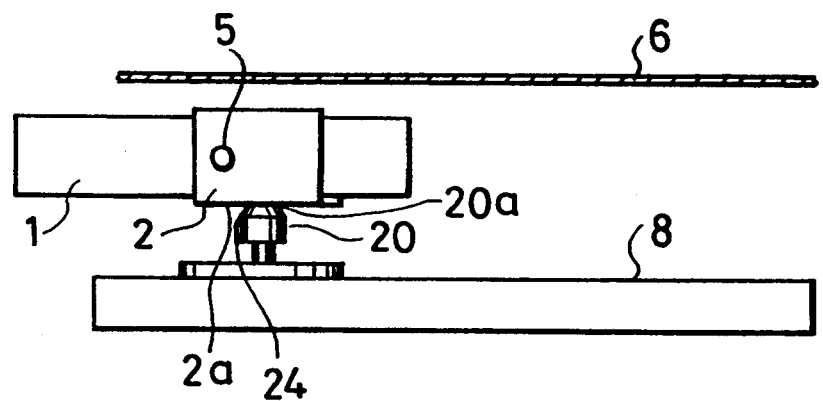

FIG. 2 is a plan view showing the reel winder 20 and FIGS. 3A and 3B are cross-sectional side views of the reel winder 20 respectively showing different state. In the figures, the reel winder 20 comprises a base member 22 a cap 23 which is press fit to a center hole 22a of the base member 22, a post 28 which is vertical to the deck 8 and inserted into the center hole 23a of the cap 23 and the center hole 22b of the base member 22 and a coupler 24 which is slidably coupled with a tube part 25 of the base member 22. A coil spring 26 is disposed between the base member 22 and the coupler 24 to bias the coupler 24 of the reel winder 20 into a cassette insertion path, as seen in FIG. 4A. The reel winder 20 is freely rotatable around the post 28. The driving force is transmitted to the outer periphery of the base member 22 by gears or the like from a driving source such as the tape driving motor 33 shown in FIG. 9. In FIG. 3A, the coil spring 26 expands by its elastic force. And in FIG. 3B, the coil spring 26 is contracted by receiving a pressure (pressure source is not shown in the figure).

Figure 5A:
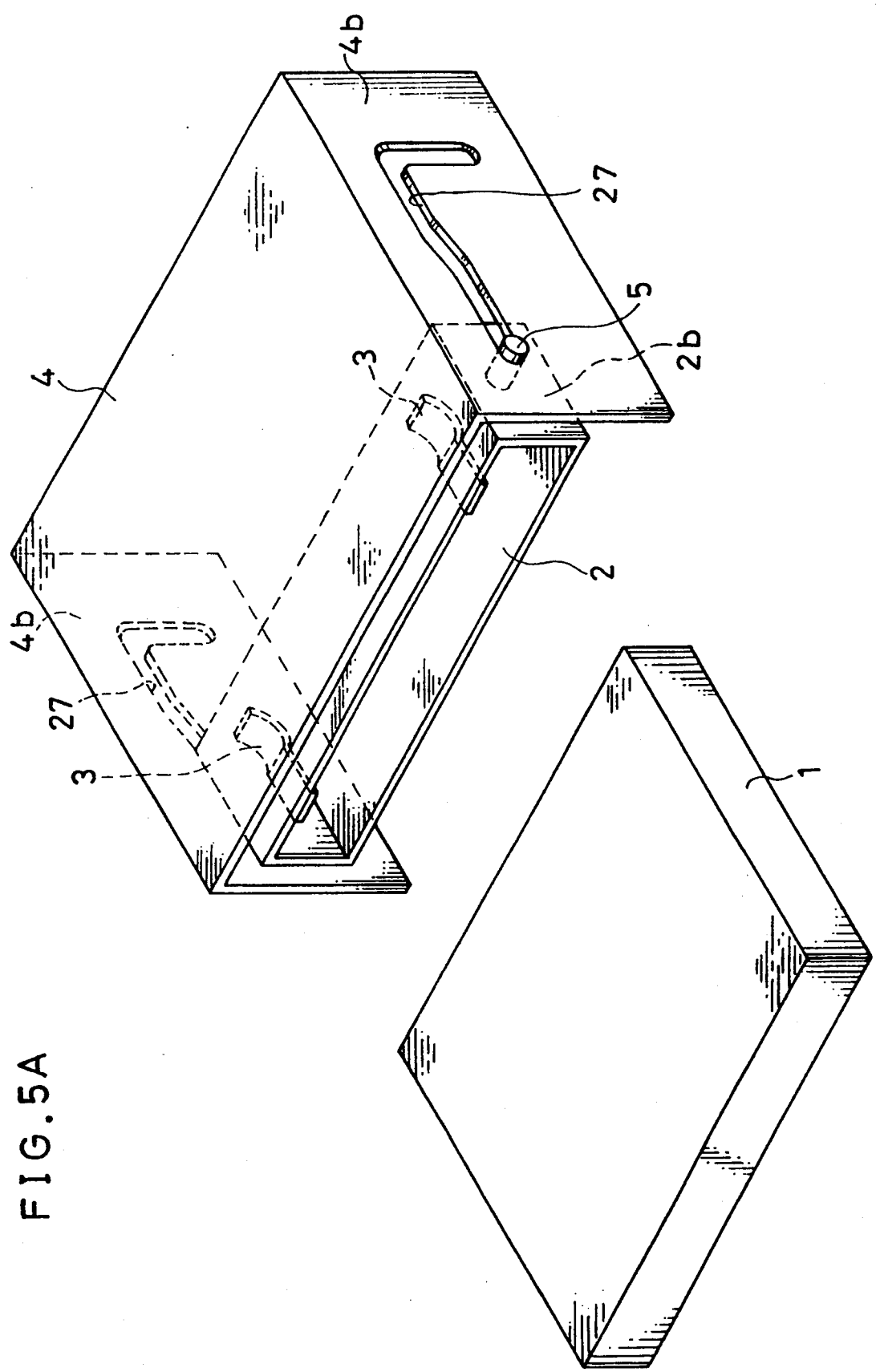
FIG. 5A is a perspective view showing a cassette holder 2 and a frame 4 of the loading mechanism of cassette tape recorder in accordance with the present invention.

FIG. 5A is a perspective view showing the details of the cassette holder 2 and the frame 4. The cassette holder 2 has springs 3 fixed thereon for pressing the cassette 1 and guide pins 5 provided on both outside walls 2b. The frame 4 has guide grooves 27 on both vertical walls 4b for guiding movement of the guide pins 5 of the cassette holder 2.

Figure 4F:
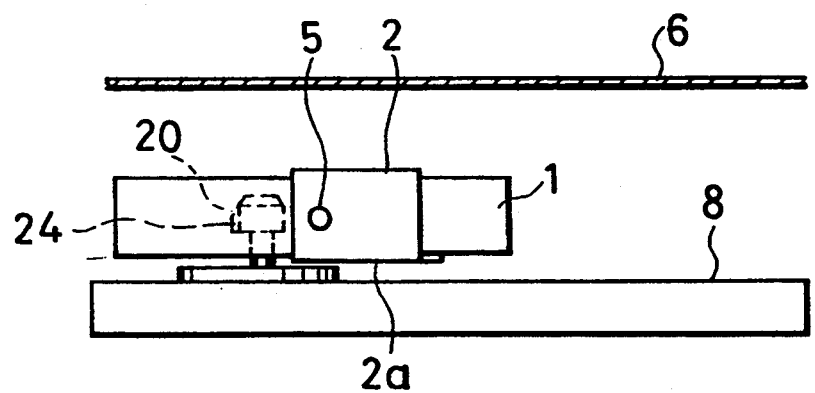
Figure 5B:
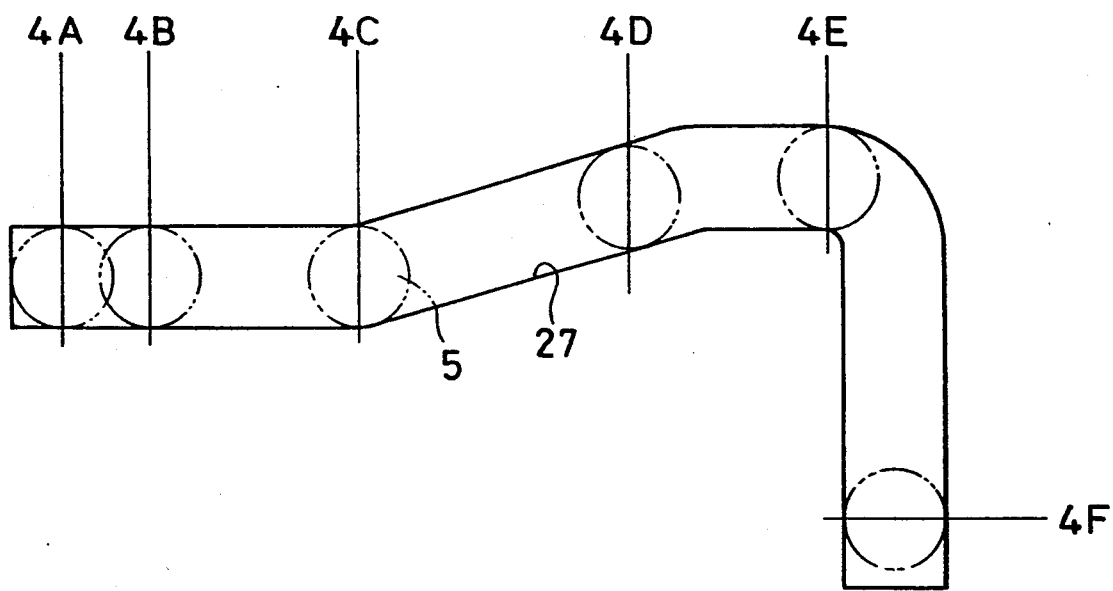
FIG. 5B is a side view of a frame showing a detail shape of a guide groove of the loading mechanism of cassette tape recorder in accordance with the present invention.
Figure 6:
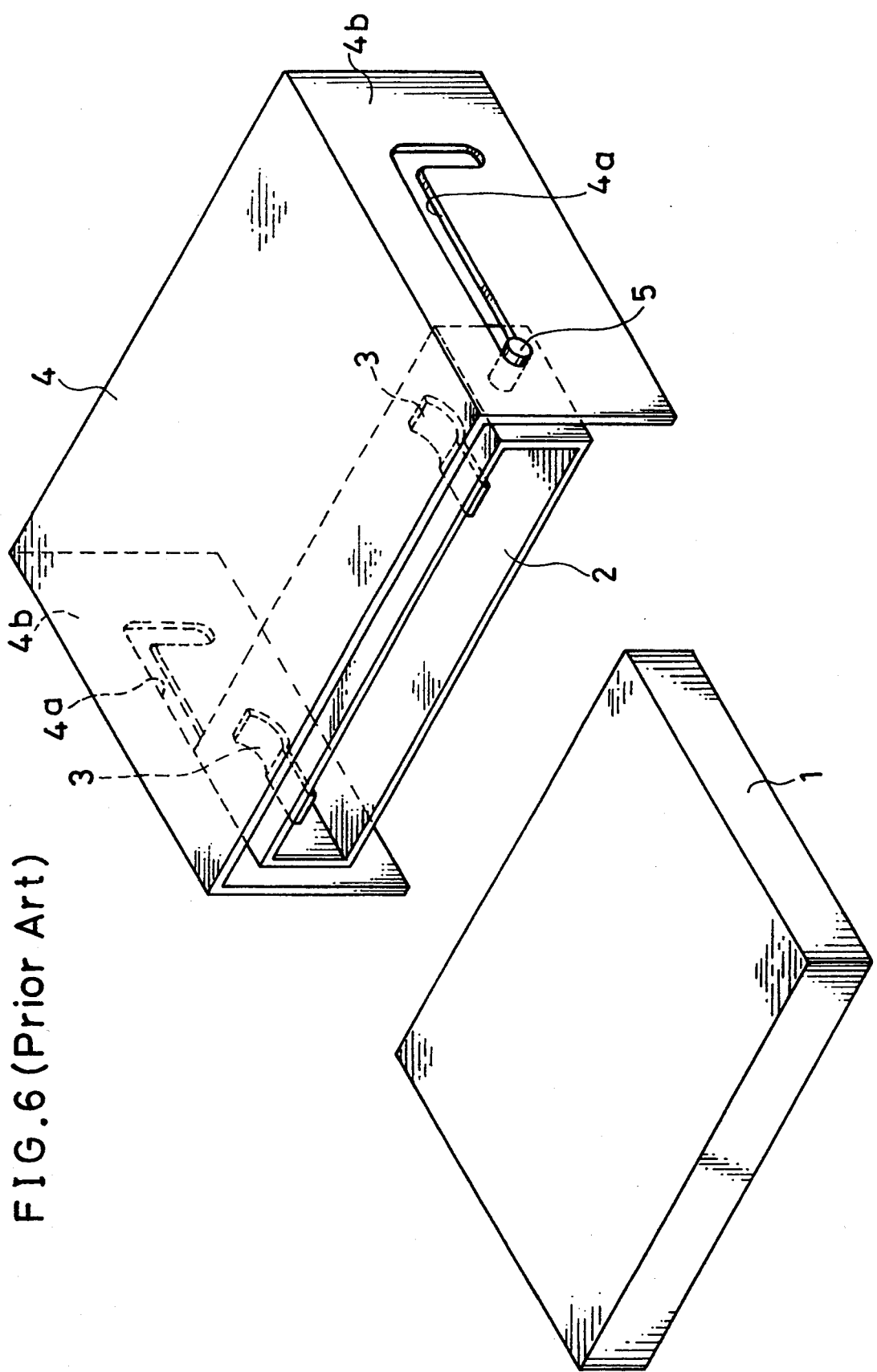
FIG. 6 is the perspective view showing the cassette holder 2 and the frame 4 of the conventional loading mechanism of cassette tape recorder.

FIG. 5B is a side view showing the details of the guide grooves 27. The cassette 1 contained in the cassette holder 2 is held by the pressure of the elasticity of the springs 3. And the cassette 1 is carried along the cassette insertion path from the insert position shown in FIG. 4A to the setting position shown in FIG. 4F by the movement of the cassette holder 2 along the guide groove 27.

At first, the bottom face 2a of the cassette holder 2 contacts and presses down the top 20a of the reel winder 20 as shown in FIG. 1 and FIG. 4A. At this time, the coupler 24 of the reel winder 20 is pressed down against the elastic force of the spring 26 as shown in FIG. 3B.

Figure 4D:
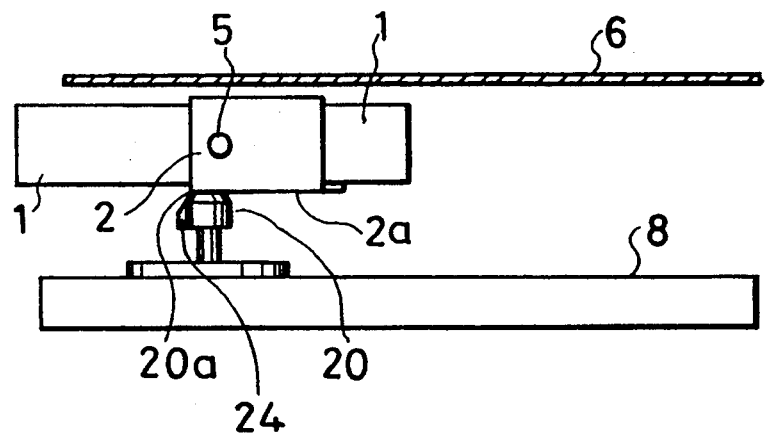
Figure 4E:
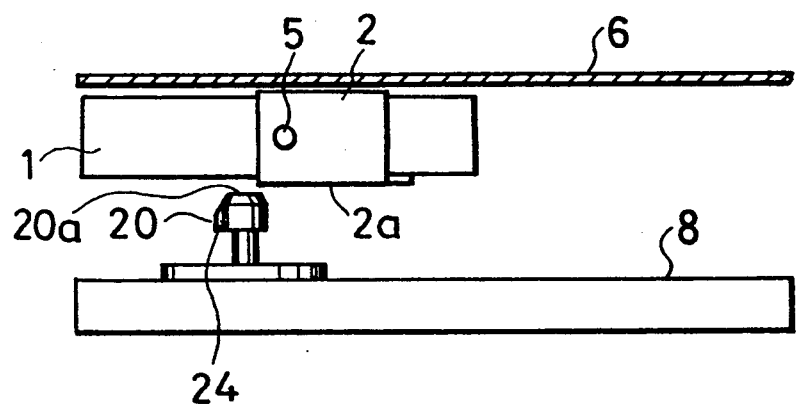

Next, the cassette holder 2 is horizontally moved contacting the reel winder 20 by a driving source (not shown in the figure because of obvious) as shown in FIGS. 4A, 4B, 4C and 4D. Furthermore, the cassette holder 2 is moved in obliquely upper direction. And the bottom face 2a of the cassette holder 2 becomes apart from the top 20a of the reel winder 20 in the vicinity of a position where a hole of the reel of the cassette 1 faces to the reel winders 20. At this time, the coupler 23 of the reel winder 20 is at its uppermost position by the pressure of the spring 26 as shown in FIGS. 3A, 4D and 4E.

After the hole of the reel of the cassette 1 faces the reel winder 20, the cassette holder 2 is moved vertically down. And positioning holes of the cassette 1 are coupled by positioning pins on the deck 8 (not shown in the figure because of obviousness). Furthermore, the hole of the reel of the cassette 1 couples the reel winder 20. As a result, the cassette 1 is positioned at a predetermined setting position as shown in FIG. 4F.

For ejecting the cassette 1 from the housing 6, processes contrary to the above-mentioned processes shown in FIGS. 4A to 4F are to be executed. Namely, the cassette holder 2 containing the cassette 1 is moved from the setting position shown in FIG. 4F to the insert position shown in FIG. 4A.

Hereupon, the sizes of the front vessel 7 on the housing 6, especially the sizes of the offset part 7a are necessary to be standardized for being mounted on, for example, the console box of the automobile. Furthermore, appearance design such as the position of the insert position of the cassette is generally given precedence over other elements. In the present Invention as mentioned above, the cassette bolder 2 is moved from the insert position to a medium position, where the whole of the cassette 1 is entered in the housing 6, pressing down the coupler 24 of the reel winder 20 against the pressure due to the elastic force of the spring 23. Therefore, the distance $H_5$ between the bottom face $2a$ of the cassette holder 2 and the front face $8b$ of the deck 8 shown in FIG. 1 is made smaller than that of $H_3$ in the conventional case shown in FIG. 8 and the distance $H_4$ between the rear face $8a$ of the deck 8 and the bottom face $6a$ of the housing 6 shown in FIG. 1 is larger than that of $H_2$ in the conventional case shown in FIG. 8. As a result, electric components $11a$, $11b$, $11c$, ..., for example, a control circuit of the DAT and a radio circuit are mounted on the rear face $21a$ of the printed circuit substrate 21.

In the above-mentioned embodiment the invention is embodied as a loading mechanism of the DAT, but it is also suitable to be embodied in other assemblies using magnetic tape contained in a cassette. Furthermore, the above-mentioned embodiment is described in the standardized housing for mounting electric part for a radio circuit; and when it does not necessitates the multifunction, the sizes of the housing can be reduced.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A loading mechanism of a cassette tape recorder, comprising:
   a deck;
   reel winding means rotatably mounted on said deck and having at least one set of
     a coupler slidably mounted on a base member for transmitting driving force to a reel in a cassette, and
     spring means for biasing said coupler into a cassette insertion path;
   a cassette holder having on outside walls thereof a pair of guide pins which are substantially parallel to a surface of said deck, said cassette holder for holding and carrying the cassette along said cassette insertion path from an insert position to a setting position on said deck, a bottom face of said cassette holder contacting the top of said coupler at said insert position and pushing said coupler against the bias of said spring means; and
   a frame having a pair of guide grooves on side walls thereof which are substantially perpendicular to said surface of said deck for guiding the movement of said cassette holder by sliding of said guide pins in said guide grooves such that said cassette holder contacts and presses said coupler out of said cassette insertion path against said bias of said spring means during movement of said holder from said insert position to a first medium position, and such that said cassette holder is separated from said coupler during movement from said first medium position to said setting position.

2. A loading mechanism of a cassette tape recorder in accordance with claim 1, wherein
   said first medium position is a position wherein substantially all of the cassette is enclosed in a housing of said loading mechanism.

3. A loading mechanism of a cassette tape recorder in accordance with claim 1 or 2, wherein
   said guide grooves have a shape such that said cassette holder moves in a direction substantially parallel to said surface of said deck to press down said coupler during said movement between said insert position and said first medium positions, said cassette holder moves obliquely upward, away from said surface from said first medium position to a second medium position where a hole of the reel of the cassette faces said coupler of said reel winding means and is spaced from said couplers, and said cassette holder moves down toward said surface from said second medium position to said setting position wherein the hole of the reel is coupled with said coupler of said reel winding means.

4. A loading mechanism of a cassette tape recorder, comprising:
   a deck,
   reel winding means rotatably mounted on said deck and having at least one set of
     a coupler slidably mounted on a base member for transmitting driving force to a reel in a cassette, and
     spring means for biasing said coupler into a cassette insertion path; and
   a cassette holder having on outside walls thereof a pair of guide pins which are substantially parallel to a surface of said deck, said cassette holder for holding and carrying the cassette along said cassette insertion path from an insert position to a setting position on said deck, a bottom face of said cassette holder contacting the top of said coupler at said insert position and pushing said coupler against the bias of said spring means.

5. The loading mechanism of claim 4 wherein said coupler is slidably mounted on said base member to limit sliding of said coupler with respect to said base member to an axial direction.

6. The loading mechanism of claim 5 wherein a distance from said substrate to the bottom of said deck is approximately equivalent to a distance from said substrate to the bottom of said housing.

7. A loading mechanism of a cassette tape recorder, comprising:
   a deck;
   reel winding means rotatably mounted on said deck, said reel winding means including
     a coupler slidably mounted on a base member for transmitting driving force to a cassette reel, and
     spring means for biasing said coupler into an insertion path;
   cassette holder means, having on outside walls thereof a pair of guide pins which are substantially parallel to a surface of said deck, for holding and translating a cassette along said insertion path from an insert position in which the cassette is substantially outside the cassette holder means to a setting position on said deck, a bottom face of said cassette holder means contacting the top of said coupler at said insert position and pushing said coupler against the bias of said spring means; and
   a frame having a pair of guide grooves on side walls thereof which are substantially perpendicular to said surface of said deck for guiding the movement of said cassette holder by sliding of said guide pins in said guide grooves such that said cassette holder contacts and compressibly forces said coupler out of said cassette insertion path against said bias of said spring means during movement of said holder from said insert position to a first medium position, and such that said cassette holder is separated from said coupler during movement from said first medium position to said setting position.

8. A loading mechanism of a cassette tape recorder, comprising:

a housing;

a deck located within said housing;

reel winding means rotatably mounted on said deck, said reel winding means including a coupler slidably mounted on a base member for transmitting driving force to a cassette reel, and spring means for biasing said coupler into said insertion path when said coupler is in said insert position;

cassette holder means, having on outside walls thereof a pair of guide pins which are substantially parallel to a surface of said deck for holding and translating a cassette along said insertion path from an insert position in which the cassette is substantially outside the cassette holder means to a setting position on said deck, a bottom face of said cassette holder means contacting the top of said coupler at said insert position and pushing said coupler against the bias of said spring means;

a frame having a pair of guide grooves on side walls thereof which are substantially perpendicular to said surface of said deck for guiding the movement of said cassette holder by sliding said guide pins in said guide grooves such that said cassette holder contacts and compressibly forces said coupler out of said insertion path against said bias of said spring during movement of said holder from said insert position to a first intermediate position at which said cassette holder is in contact with a side of said coupler, and such that said cassette holder is separated from a lateral peripheral surface of said coupler during movement from said first intermediate position to said setting position; and a substrate located between a bottom of said deck and a bottom of said housing, wherein electronic components are disposed on both a top face and a bottom face of said substrate.

* * * * *